United States Patent [19]
Vidrascu et al.

[11] Patent Number: 5,583,940
[45] Date of Patent: Dec. 10, 1996

[54] METHOD, APPARATUS AND DEVICE FOR ENCIPHERING MESSAGES TRANSMITTED BETWEEN INTERCONNECTED NETWORKS

[75] Inventors: Andrei Vidrascu, Saint-Germain en Laye; Yves M. J. Dherbecourt, Sceaux; Jean-Marc Herodin, Bievres, all of France

[73] Assignee: Electricite de France - Service National, Paris, France

[21] Appl. No.: 256,509

[22] PCT Filed: Jan. 28, 1993

[86] PCT No.: PCT/FR93/00092

§ 371 Date: Sep. 23, 1994

§ 102(e) Date: Sep. 23, 1994

[87] PCT Pub. No.: WO93/15581

PCT Pub. Date: Aug. 5, 1993

[30] Foreign Application Priority Data

Jan. 28, 1992 [FR] France ................................. 92 00881

[51] Int. Cl.⁶ .................................................. H04L 9/00
[52] U.S. Cl. ................... 380/49; 380/9; 380/23; 380/25; 380/29; 235/380; 235/382
[58] Field of Search .................................. 380/23, 25, 49, 380/9, 28, 29, 50, 59; 340/825.31, 825.34; 235/380, 382

[56] References Cited

U.S. PATENT DOCUMENTS

| | | | |
|---|---|---|---|
| 4,203,166 | 5/1980 | Ehrsam et al. | 380/49 X |
| 4,227,253 | 10/1980 | Ehrsam et al. | 380/49 X |
| 5,070,528 | 12/1991 | Hawe et al. | 380/48 |
| 5,309,437 | 5/1994 | Perlman et al. | 370/85.13 |

FOREIGN PATENT DOCUMENTS 8910666 11/1989 WIPO.

OTHER PUBLICATIONS

Bellovin, S. M.: "Security Problems in the TCP/IP Protocol Suite", Computer Communication Review, vol. 19, No. 2, pp. 32–48, Apr. 1989.

Königs, H.-P.: "Cryptographic Identification Methods for Smart Cards in the Process of Standardization", IEEE Communications Magazine, vol. 29, No. 6, pp. 42–48, Jun. 1991.

Computer Communication Review, vol. 19, No. 2, Apr. 1989, New York US, pp. 32–48, by S. M. Bellovin, entitled "Security Problems in the TCP/IP Protocol Suite".

"Security for Computer Networks", by D. W. Davies et al, 1989, J. Wiley, New York, U.S., appearing in "Wiley Series in Communication and Distributed Systems".

Philips TDS Review, vol. 47, No. 3, Sep. 1989, Hilversum, Netherlands, pp. 1–19, by R. C. Ferreira, entitled "The Smart Card: A High Security Tool in EDP".

Primary Examiner—Bernarr E. Gregory
Attorney, Agent, or Firm—Antonelli, Terry, Stout & Kraus

[57] ABSTRACT

A method of enciphering messages transmitted between at least two networks (2, 17) interconnected via at least one highway (8), the interconnected networks (2, 17) using the Internet protocol (IP, as network layer protocol and the TCP or UDP protocol, as transport layer protocol, the highway (8) using a specified network layer protocol, each message comprising a plurality of headers (73–76), including an IP header (75) and a TCP or UDP header (76, 80, 81), and data (77). The specified network layer protocol of the highway is the Internet protocol (IP). For each of the messages, at least a part (82, 83, 84, 85) of the TCP or UDP header (76, 80, 81) is enciphered at the same time as the data (77) and the IP header (75) is plain (non enciphered) to enable the transmission of the message by the highway according to the Internet protocol (IP).

12 Claims, 6 Drawing Sheets

- 71 — PREAMBLE
- 72 — SFD
- 73 — ETHERNET HEADER
- 74 — ISO 8802.2 HEADER
- 75 — IP HEADER
- 76 — TCP (OR UDP) HEADER
- 77 — TCP (OR UDP) DATA
- 78 — FCS

- DESTINATION ADDRESS
- SOURCE ADDRESS
- TYPE OR LENGTH

- DSAP
- SSAP
- CHECK
- IDENTIFIER PROTOCOL
- ETHER TYPE

METHOD, APPARATUS AND DEVICE FOR ENCIPHERING MESSAGES TRANSMITTED BETWEEN INTERCONNECTED NETWORKS

BACKGROUND OF THE INVENTION

The present invention relates to a method of enciphering messages transmitted between networks interconnected via highways using a specified network protocol, in particular and for example the Internet protocol (IP), a device for communicating enciphered data between at least two items of equipment belonging to two different networks interconnected via highways using the specified network protocol, and an enciphering apparatus implementing the aforesaid method.

SUMMARY OF THE INVENTION

The term highway is to be understood as meaning a network or intermediate medium enabling the messages to be carried.

A protocol is a set of conventions or rules which define in particular the format, the sequences, the algorithm for detecting errors of transmission of the transferred data, etc.

A network protocol corresponds to a level 3 network layer of the OSI layered architecture (X200 Standard) proposed by the ISO (International Standardisation Organisation). The role of the network layer is to provide the procedures and functional mechanism required for exchanging the information given by the OSI transport layer. The data packets are routed in the form of messages comprising "headers" affixed to the data and consisting of several segments indicating in particular the address of the sender and of the receiver.

The present invention has a preferred application of protecting access to the servers of remote computer networks.

Devices allowing the enciphering of data transferred serially over a low-speed line, for example according to the CCITT V24 recommendation (two-wire RS 232 serial link), are already known. Such devices provide for encipherment of the transmitted data messages and their headers, without concern for a protocol. This type of device, developed in particular in the area of banking, also operates with microprocessor cards.

It has disadvantages. Indeed it is of limited scope and does not allow, in particular, interconnection and communication of data between two networks in complete security, via unmonitored highways.

The present invention provides a method of enciphering messages transmitted between interconnected networks, an apparatus and a device implementing such a method responding to the requirements of practice better than those previously known, in particular in that it enables data to be transferred between items of equipment connected to these networks, in an enciphered manner and in complete security, while implementing a simple method easily adaptable to existing protocols and equipment.

For this purpose, the invention is a method of enciphering messages transmitted between networks interconnected via highways using a specified network protocol, characterised in that the messages are enciphered while keeping the "header" part of the message plain (not enciphered) allowing its routing via the highways.

Such enciphering makes it possible to provide for the transfer of data while protecting confidentiality, over the network parts or highways considered insecure and situated between the relevant networks.

Advantageously, the network protocol being used is the Internet protocol (IP). The enciphering method has the messages enciphered while keeping the IP headers plain (not enciphered) and enciphering at the same time as the data at least a portion of the headers corresponding to the TCP or UDP transport protocols being used.

The IP protocol is a sub-layer of the network layer (layer 3) of the OSI layered architecture. The Internet layer converts any network service into a data transmission and thus standardises the networks with respect to the transport layer (layer 4 of the ISO architecture).

The TCP and UDP protocols are transport layer protocols, TCP (Transmission Control Protocol) provides a so-called virtual circuit surface and uses an acknowledgement system for error checking; and UDP (User Datagram Protocol) provides a medium for transactional protocols not requiring the same checks as TCP.

In a preferred embodiment, the cryptosystem used for enciphering the messages is the DES system (Data Encryption Standard). This is a cryptosystem corresponding to an American standard and using a 56-bit key.

Advantageously, the DES system is used in CBC mode.

The DES (Data Encryption Standard) and its CBC (Cipher Block Chaining) mode of operation are described in the following standards:

"Data Encryption Standard", Federal Information Processing Standards Publication 46, National Bureau of Standards, U.S. Department of Commerce, January 1977;

"DES Modes of Operation", Federal Information Processing Standards Publication 81, National Bureau of Standards, U.S. Department of Commerce, December 1980.

The advantage of the CBC mode lies essentially in the fact that, if a string of identical values is enciphered, the enciphered results of each identical value will not be the same.

Also advantageously, the entirety of a data message, as well as the portion, partial or total, of the corresponding TCP or UDP header is enciphered so as to obtain a string of bits with a length divisible by 64.

In a preferred embodiment, the enciphered TCP or UDP header portion comprises the so-called "checksum" part.

The TCP/UDP checksum is a checksum calculated by the sender of the message according to the algorithm described in the RFC793 standard as a function of the data to be transmitted, which data is inserted into the message. The RFC (Request For Comments) are documents published by the Internet Activies Board, which perform a general standards function, and which can be obtained from Government Systems, Inc., Network Information Center, 14200 Park Meadow Drive, Suite 200, Chantilly, Va. 22021, U.S.A.

The receiver recalculates this checksum as a function of the data received. If the value found is different from that transmitted in the message, the receiver concludes that the message received is not valid. There is therefore a check of integrity. The enciphering apparatus enciphers and advantageously deciphers this checksum in order to make unauthorized changing of the message impossible by virtue of the recalculation of a correct checksum of the message that has been impermissibly modified. If such changing were the case, the "inevitable" deciphering of the checksum renders the value of the latter incorrect and causes the message to be rejected by the receiver.

This method therefore guarantees the integrity of messages with regard to risks of unauthorized changes.

The invention also is a method of processing messages transmitted between items of equipment belonging to at least two interconnected networks each including at least one item of equipment authorized to send and receive messages enciphered by the method of encipherment described above, characterised in that the processing of a message includes the following steps:

verification of the presence of a memory card for authentication of the operator of the first item of equipment, verification of the protocol used between the two items of equipment, and if the protocol is the specified protocol (for example the TCP/IP or UDP/IP protocol), searching for a key associated with the sender equipment and for a key associated with the receiver equipment;

if the two keys exist, encipherment of the message and transmission of the message and otherwise rejection of the message, verification of the presence of a memory card for authentication of the operator of the second item of equipment;

verification of the protocol used between the two items of equipment, and if the protocol is the specified network protocol (for example TCP/IP or UDP/IP), searching for a key associated with the sender equipment and for a key associated with the receiver equipment;

if these two keys exist, decipherment of the message and otherwise rejection of the message.

The term "key" should in particular be understood to mean a group of specific data which are predetermined or can be calculated by a predetermined algorithm, which is provided for authorized users only.

The enciphering and deciphering steps each use a key. In order that enciphering be carried out successfully, a deciphering key must be used which is associated with the enciphering key which was used.

In the case of a so-called symmetric enciphering algorithm, such as the DES, the enciphering and deciphering keys must be identical. A convention enabling this key to be deduced from the pair (key associated with the sender equipment, key associated with the receiver equipment) is used; this convention can be, for example, to choose the key associated with the sender equipment, or else to use the result of a mathematical function of the pair of keys.

In the case of a so-called asymmetric enciphering algorithm, the enciphering and deciphering keys are different, although mutually dependent. The convention enabling the enciphering key to be deduced from the pair (key associated with the sender equipment, key associated with the receiver equipment), is different from the first, according to the same convention.

The invention is also a device for communicating data messages between at least two items of equipment associated with two different networks interconnected via at least one highway using a specified network protocol [for example the Internet protocol (IP)], characterised in that the device comprises, for each network or its associated item of equipment, means for reading a memory card and an interface apparatus comprising:

message enciphering means configured for enciphering the data and at least partially the headers corresponding to the transport protocol (for example TCP or UDP) for the messages, and means for transferring the enciphered messages, while keeping the headers of the enciphered messages (not enciphered), allowing their routing via the highway;

means for identifying networks or authorised items of equipment associated with the interface apparatuses;

and means configured for deciphering the enciphered messages in response to signals generated by the memory-card reading means and the means for identifying the networks or items of equipment.

The interface apparatus shall be able to be associated directly or via a protected network, either with an item of equipment of the station type, or with an item of equipment of the server type.

An item of equipment of the station type is for example a conventional PC microcomputer equipped with an ETHERNET card or a UNIX workstation. The device then authorizes the communicating in enciphered mode of this station with only the authorised server or servers or stations whose tags have been introduced into the interface apparatus.

By contrast, an interface apparatus associated with an item of equipment of the server type allows the server to communicate in enciphered mode with stations or other servers registered in the interface apparatus, and for example in enciphered mode with any other item of equipment.

In a preferred embodiment the latter possibility can be prohibited through a specific configuration of the device.

The invention is also an interface apparatus for a data message communication device of the type described above comprising:

message enciphering means configured for enciphering the data and at least partially the headers corresponding to the transport protocol (for example TCP or UDP) for the messages;

means for transferring the enciphered messages, while keeping the headers (for example IP) of the enciphered messages without enciphering, allowing their routing via the highway;

means for identifying networks or authorized items of equipment associated with the interface apparatuses;

and means configured for deciphering the enciphered messages in response to signals generated by the memory-card reading means and the means for identifying the said networks or items of equipment.

Advantageously, the apparatus is more particularly configured so as to be associated with an item of equipment of the server type.

The invention will be better understood on reading the description which follows of particular embodiments given by way of non-limiting examples.

BRIEF DESCRIPTION OF THE DRAWINGS

The description makes reference to the accompanying drawings in which.

DESCRIPTION OF THE PREFERRED EMBODIMENTS

Figure 1:
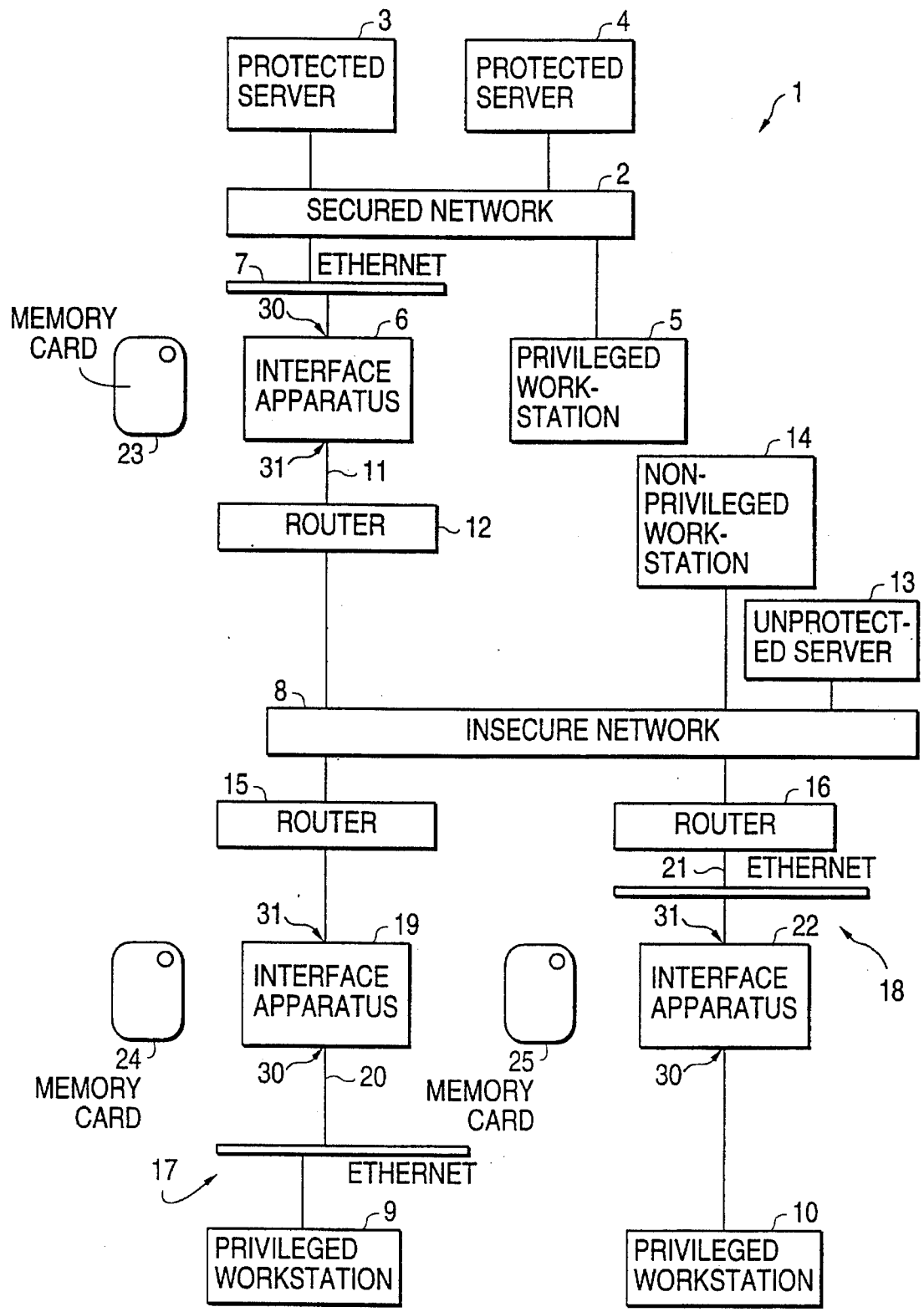
FIG. 1 shows a device for communicating between equipment belonging to several different networks, interconnected via highways using the Internet protocol, according to one embodiment of the invention.

A device 1 for communication according to a particular embodiment of the invention, between equipment belonging to several networks, has been represented in FIG. 1.

A first network 2, dubbed secured network, comprises for example a first protected server 3, a second protected server 4, and a privileged workstation.

A first interface apparatus 6 is connected to the network 2 by an Ethernet link 7. It is configured so as to filter the messages intended for the protected servers 3 and 4 arriving from a non-secure network 8, and to authorize access to these protected servers with respect to the privileged workstations 9 and 10. The apparatus 6 is connected to the non-secure network 8 by way of an Ethernet link 11, for example via a router 12, or by any other item of equipment utilising an Ethernet interface of DTE type (according to ISO Standard 8802.3).

Such a connection system is that of a bridge. An MAU/MAU adapter (not shown) is provided with the interface apparatus 6 which splits off from the Ethernet link 7.

The MAU (Medium Acces Unit) adapter is known per se and in particular performs the data coding and decoding functions, synchronisation and recognition of frames.

The non-secure network 8 comprises for example an unprotected server 13 and a non-privileged workstation 14. It is connected via routers 15 and 16 to two networks 17 and 18.

The first network 17 is protected. It is equipped with a second interface apparatus 19 connected to the network 17 through an Ethernet link in a manner similar to that discussed above. The network 17 comprises in particular a privileged workstation 9. In this case, the apparatus 19 is therefore associated with any network (network 17) which can be privileged.

Network 18 is connected to network 8 via the router 16 through an Ethernet link 21 as described above.

It includes the station 10 interfaced with the remainder of the network 18 by way of an interface apparatus 22. Hence, in this case only the station 10 is privileged.

Memory cards 23, 24, 25 are moreover provided in order to enable the interface apparatuses 6, 19 and 22. The following remarks are also made with reference to FIG. 1:

The station 5 can access the protected servers 3 and 4 since no interface apparatus separates them. By contrast, it cannot access the server 13 (if the latter is active).

The interface apparatus 6 secures access to the two portected servers 3 and 4 with regard to the stations 14, 9 and 10.

The interface apparatus 19 and 22 allows the workstations 9 and 10 respectively access to the servers 3 and/or 4 if the interface knows the key of the servers 3 and/or 4.

An interface apparatus according to the embodiment of the invention is more particularly described as follows.

As has been seen, the interface apparatuses are therefore, in this case, items of equipment appended to the network in order to secure access to one or more servers.

Each interface apparatus includes a microprocessor-card reader, an operator interface composed of a sixteen keys keyboard and a display, and two Ethernet interfaces of DTE type (according to ISO Standard 8802.3). An MAU/MAU adaptor box allows the interface apparatus to be split off from the down cable (blue Ethernet cable).

In the embodiment of the invention more particularly described herein, the role of the interface apparatus is to ensure the integrity and confidentiality of the communications using the DoD IP/TCP and IP/UDP protocols described in the standards RFC 791, RFC 768, RFC 1122, RFC 1166, RFC 1042 (RFC are the initials of Request For Comments) if and only if an entitlement procedure using a microprocessor card has been correctly executed and if the card is in the reader of the interface apparatus. A protected table inside the interface apparatus includes DES keys associated with the IP addresses of the senders.

The principle for processing frames in the interface apparatus, when the entitlement procedure is correct, is given below:

When IP data transmission transporting a TCP or UDP protocol is received (normally plain) on the interface 30 (See FIG. 1), and if the keys related to the IP addresses of the sender and of the receiver are found, a part of the user data of this transmission is enciphered with a DES algorithm by using a key related to the IP address of the sender. The transmission is next sent to the interface 31;

When an IP data transmission transporting a TCP or UDP protocol is received (normally enciphered) on the interface 31, and if the keys related to the IP addresses of the sender and of the receiver are found, a part of the user data of this datagram is decrypted with a DES algorithm by using a key related to the IP address of the sender (the same key as that having served in the enciphering). The datagram is next sent to the interface 30;

The IP/TCP or IP/UDP data transmissions received on one or the other of the interfaces 30 or 31 having a sender IP address or a receiver IP address for which no key can be found are discarded or retransmitted as a function of a configuration parameter "X";

The other data transmission (neither IP/TCP or IP/UDP) received on one or the other of the interfaces 30 or 31 are retransmitted to the other interface without processing.

In the case where the entitlement procedure has not been correctly executed or if no card is present in the reader, a configuration parameter "Y" decides:

To retransmit, without processing, all the frames received from one interface to the other (so-called workstation mode);

To discard all the IP/TCP and IP/UDP frames received (so-called server mode). The upper frames are retransmitted without processing.

The interface apparatus therefore must:

provide for the security functions, interface with the environment, be initialized during installation, provide for the modification of certain data (administration).

Figure 2:
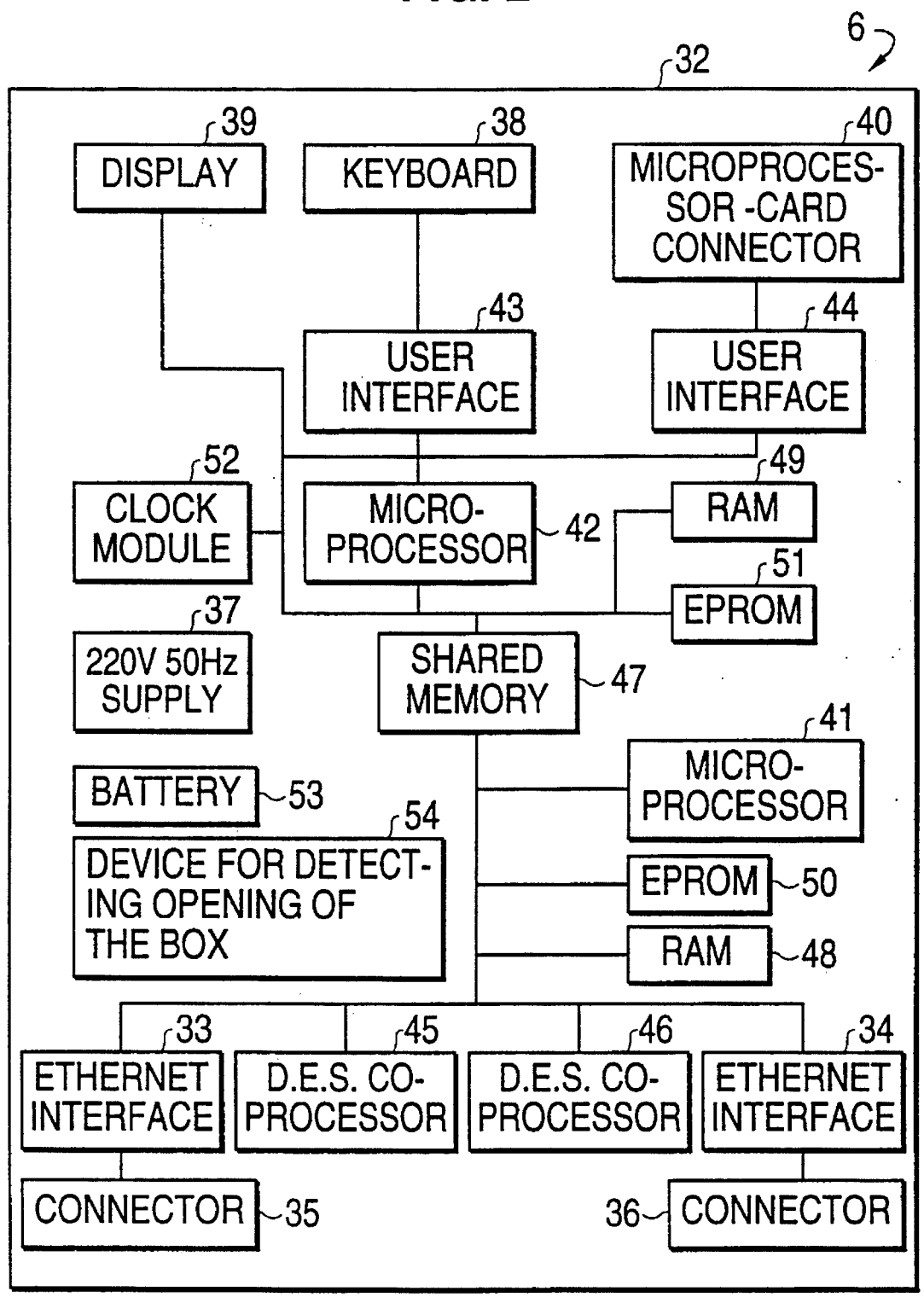
FIG. 2 is a the block diagram of an interface apparatus according to the embodiment of the invention more particularly described here.

FIG. 2 is a block diagram of the interface apparatus 6, 19 or 22 which are particularly described here, in a non-limiting manner.

The latter includes a box 32, for example metallic, two initial Ethernet interfaces 33 and 34 of DTE type, with two female fifteen-slot connectors 35 and 36 (labelled 30 and 31 in FIG. 1), a 220 V 50 Hz supply labelled 37 in FIG. 2, with on/off switch and fuse (not shown), a sixteen key keyboard 38, a twenty-character, two-line display 39, a microprocessor-card connector 40, an electrical supply cable (not shown), a fifteen-wire Ethernet connecting cable complying with ISO Standard 8802.3 (not shown) and one or more processors and coprocessors with their memory and associated peripherals identified by reference numerals 41 to 52 in FIG. 2.

The microprocessor card is for example a card manufactured by the French company BULL identified by catalogue reference BULL CAM CP8 mask 4.

Likewise, and as an example, the interface apparatus comprises a microprocessor 41 of the INTEL 80960CA type used to manage the two Ethernet interfaces 33 and 34 and a microprocessor 42 of the INTEL 80C186 type used to manage the user interfaces 43 and 44.

Two DES coprocessors 45 and 46 of the CRYPTECH CRY12C102P type, manufactured by the Belgian company CRYPTECH, 510–512 Chaussée de Louvain, Boîte 18, B-1930 ZAVENTEM, BELGIUM are provided for enciphering and deciphering the messages. Each coprocessor is linked directly to the bus of the 80960CA processor and functions as a peripheral.

Two additional coprocessors (not shown) of the INTEL 82596CA type are associated with the INTEL 80960CA processor in order to manage the interfaces 33 and 34.

Dialog between a coprocessor and the 80960CA processor is carried out by means of a shared memory 47. Finally, random-access (RAM) memories 48, 49 read-on (EPROM) memories 50, 51, and a clock module 52 are provided.

A battery 53 and a device 54 for detecting opening of the box 32 complete the interface apparatus according to the embodiment of the invention more particularly described herein.

Figure 3:
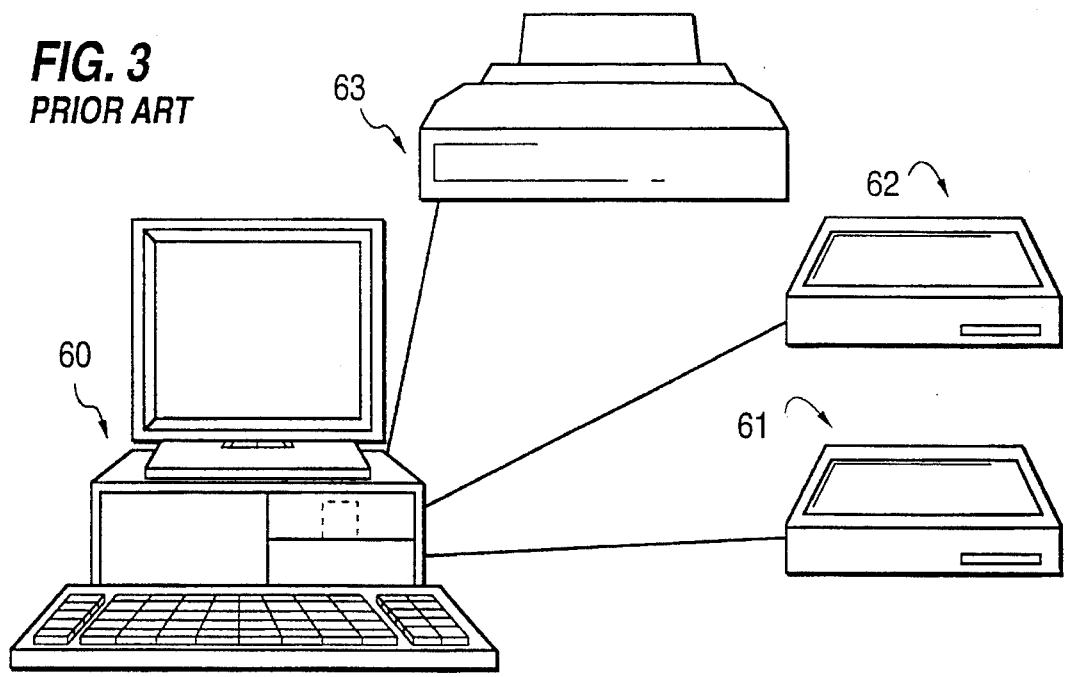
FIG. 3 shows a prior art station allowing the programming of the memory cards which can be used with the practice of the invention.

FIG. 3 shows a prior art station allowing the programming of the memory cards in a manner known per se.

The station comprises an IBM PC/AT compatible microcomputer 60 linked to two readers/encoders 61 and 62 of microprocessor cards, for example of the type manufactured by the French company BULL identified by the catalogue reference TLP 224 of BULL CP8 and a printer 63.

The operation of the device according to the invention will now be described with reference in particular to FIGS. 1 to 3 and more particularly to FIG. 1 and to the communications between the network 18 and the network 2.

The user of the station 10 (network 18) is identified by the microprocessor card 25. The parameters inspected are the following:

the bearer's identification;

the type of the card.

The bearer's identification is searched for, for example, in a list of 100 identifiers, inputted during installation. This list can be modified by an authorised operator of the interface apparatus 22.

The date of validation read from the card 25 is compared with the date of the interface apparatus 22. Advantageously, in order to avoid resetting the time with each powering up, the interface apparatus possesses a clock module 52 backed up by a battery 53.

The date of validation of the card is inputted via the reader/encoder 61, for example, when the card is created.

The user is then authenticated step 91 by the code present on the microprocessor card 25.

Identification and authentication are done locally in the interface apparatus 22. Should this be successful, the interface apparatus becomes active until the card is extracted. If a single parameter is invalid the interface apparatus remains inactive.

The interface apparatus 6 associated with the servers 3 and 4 next identifies the workstation 10 by virtue of unique IP address.

This same interface apparatus 6 authenticates the workstation 10 by deciphering the message received.

The deciphering key is retrieved from a table starting from the IP address of the sender (workstation 10 in this case). The interface apparatus 6 associated with the servers 3 and 4 therefore possesses as many deciphering cases keys as there are workstations authorized to access the associated servers. These keys and these addresses are inputted during installation of the interface apparatus 6.

The enciphering key is retrieved 94 from a table starting from the IP address of the sender (server 3 or 4 in this case). The interface apparatus 6 associated with the servers 3 and 4 therefore possesses as many enciphering keys as there are servers associated with this interface apparatus. These keys and these addresses are inputted during installation of the interface apparatus 6.

Figure 13:
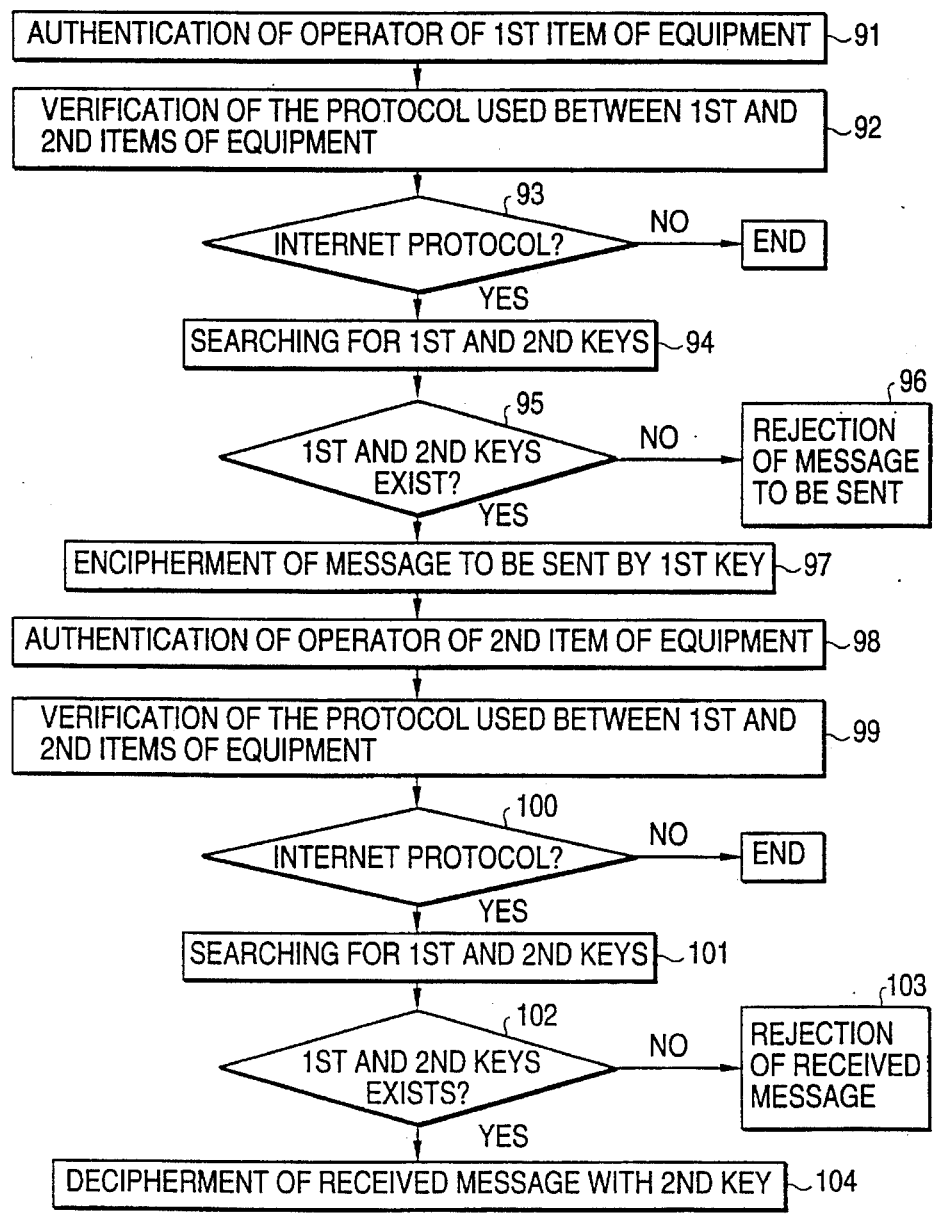
FIG. 13 is a flowchart illustrating an embodiment of the method of the invention.

The algorithm for processing a received frame is set forth in the following listing which corresponds to steps 98 to 104 in FIG. 13:

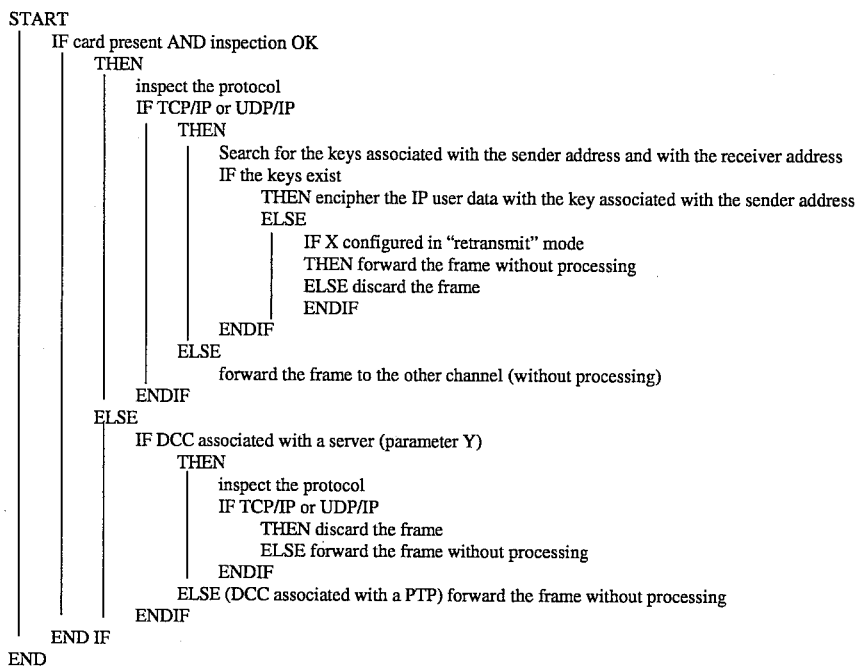

A cache memory of one to three keys can be provided in a manner known per se in order to avoid useless searches when several data transmissions having the same addresses arrive consecutively.

Identification and authentication 98 of the server will be performed in a manner similar to what was described earlier in the case of identification and authentication 91 of the workstation.

The interface apparatus 22 associated with the workstation 10 identifies the server 3 (or 4) by virtue of its unique IP address.

This same interface apparatus 22 authenticates the server by deciphering the received message.

The deciphering key is retrieved 101 from a table starting from the IP address of the sender server 3 or 4. The interface apparatus 22 associated with the workstation 10 therefore possesses as many deciphering keys as there are protected servers which it may access (here two). Here again these keys and these addresses are inputted during installation of the interface apparatus 22.

The algorithm is the same as described above.

A cache memory of one to three keys can likewise be provided in order to avoid useless searches when several data transmissions having the same addresses arrive consecutively.

Regarding the confidentiality of the messages, this is ensured through enciphering on sending 97 and deciphering on receiving 104 by using the DES (Data Encryption Standard) algorithm in CBC mode.

The DES algorithm is symmetric with secret keys. The key used to encipher 97 a frame is associated with the IP address of the sender.

As has been seen, one of the advantages of the CBC mode lies in the fact that two consecutive transmitted identical sent series of values do not yield two identical series of enciphered values.

To avoid an authorized replay of an enciphered message exchange obtained by passive listening, there is advantageously provision for time and date coding of the initial vector for enciphering and deciphering, which vector is required by the CBC mode. The time and date coding is provided for by a clock device present in each item of equipment.

In other words, the initial vector varies as a function of time.

Figure 4:
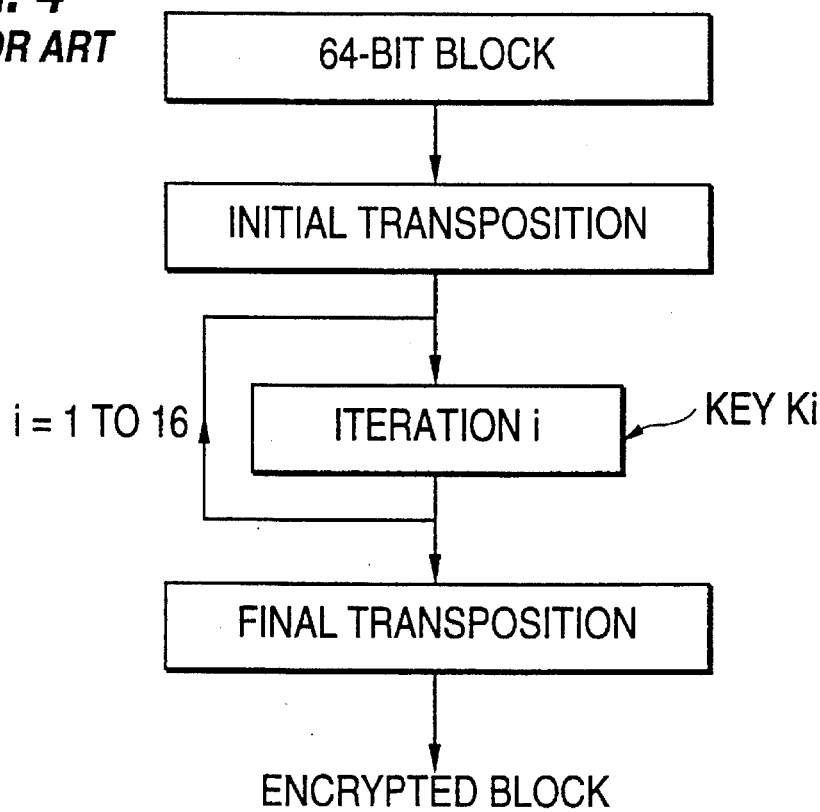
FIGS. 4 and 5 show the prior art principle used in the DES cryptosystem implemented in the method of the invention more particularly described here.

The principle of the enciphering of a message using the DES algorithm is explained below with reference to FIGS. 4 and 5.

Let P be a plain message. The sender begins by writing out the message P in binary form, using any binary alphabet to do so. It next splits up its message into blocks of 64 bits and carries out the same operation on each block as FIG. 4 shows. Each transposition is a simple "mixing" of the 64 bits.

Figure 5:
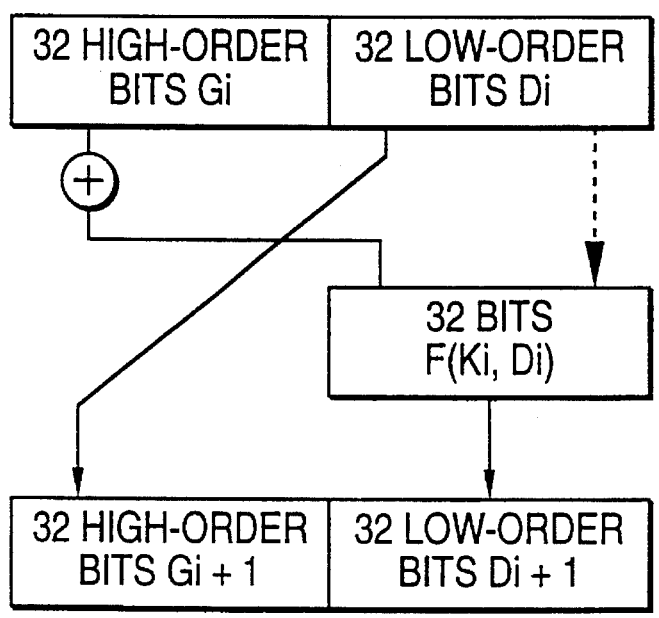

The prior art principle of the sixteen iterations used in the DES enciphering is illustrated in FIG. 5. The 32 low-order bits $D_{i+1}$ are obtained by adding (exclusive or operation) the 32 high-order bits $G_i$ calculated from the key $K_i$ and from the 32 bits $D_i$.

The receiver must know the 56-bit key K and uses exactly the same algorithm starting from the encrypted block in order to decipher it. It then obtains the plain message.

The enciphering and deciphering 84, 85 are is carried out on the data field 77 and on a part of the TCP or UDP header. The fields of the header which are used depend on the size of the data field since the DES algorithm in CBC mode works on 64-bit words.

The elements constituting an Ethernet/IP/TCP or UDP frame are illustrated in FIGS. 6 to 11.

Figure 6:
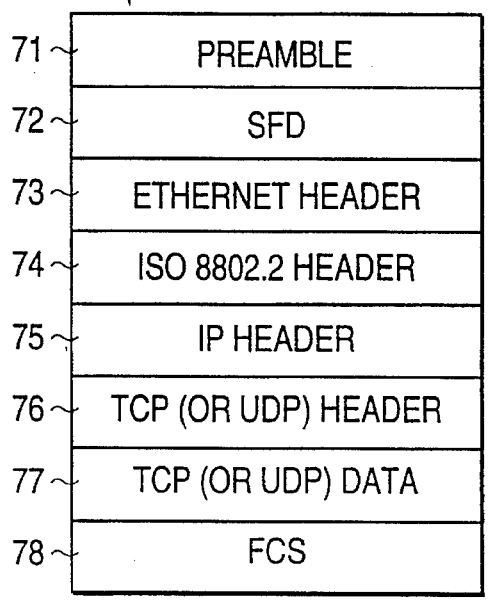
FIGS. 6, 7, 8, 9, 10 and 11 illustrate the prior art IP/TCP or IP/UDP Ethernet frame (FIG. 6), the Ethernet header (FIG. 7), the ISO header (FIG. 8), the IP header (FIG. 9), the TCP header (FIG. 10) and of the UDP header (FIG. 11).

FIG. 6 shows the prior art general format 70 of an Ethernet frame.

This frame includes a preamble 71, an SFD (Start Frame Delimiter) field 72, an Ethernet header 73, an ISO 8820.2 header 74, an IP header 75, a TCP or UDP header 76, data 77 and an FCS (Frame Check Sequence) field 78.

The ISO header 74 is not necessarily present. The ISO header disappears if the value of the contents of the "type or length" fields of the ETHERNET header 73 are greater than the value 1518 in a decimal mode.

Figure 7:
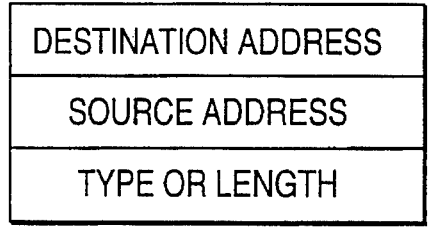
Figure 8:
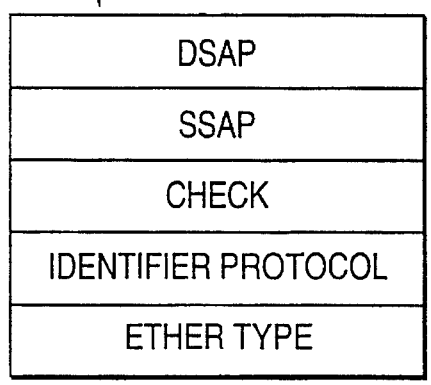
Figure 9:
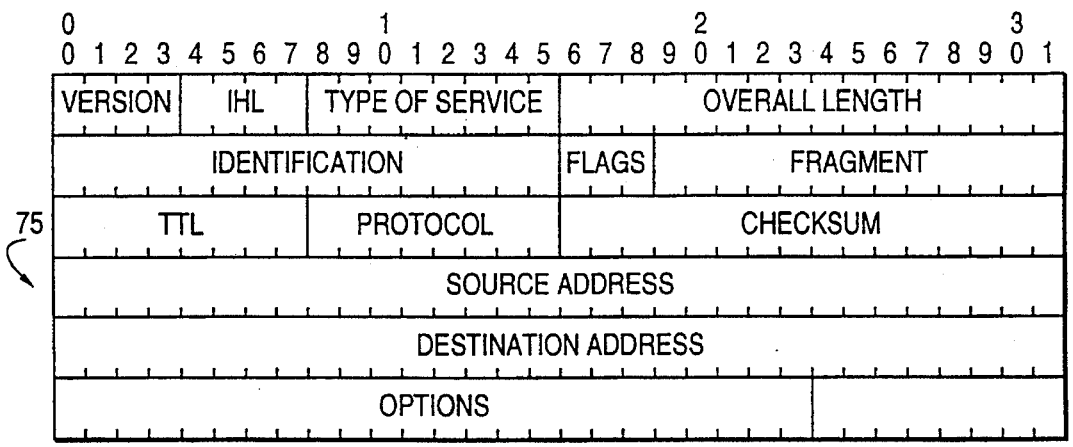
Figure 10:
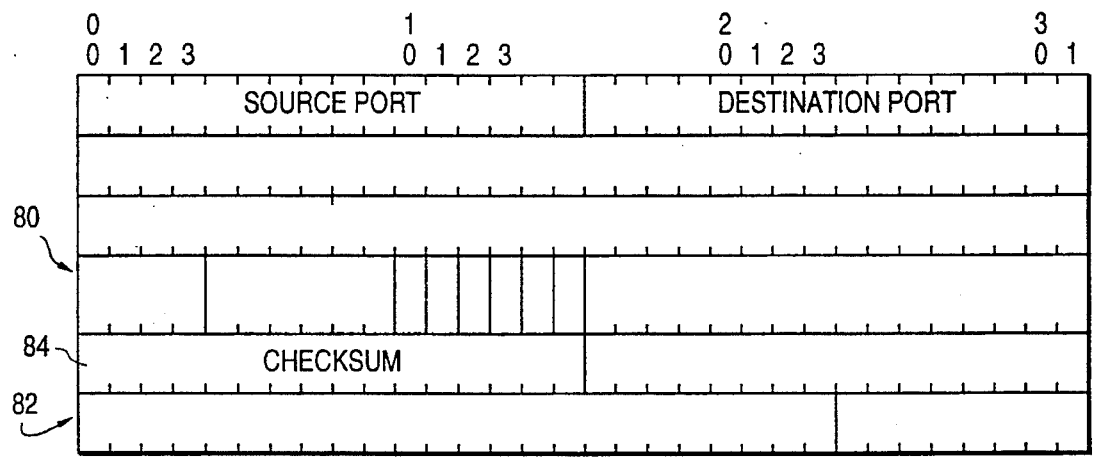
Figure 11:
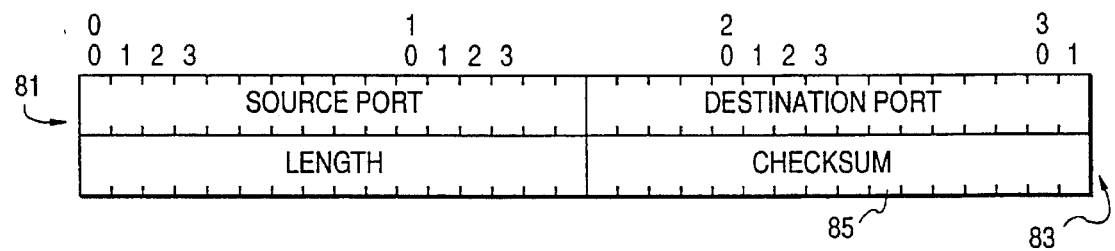
Figure 12:
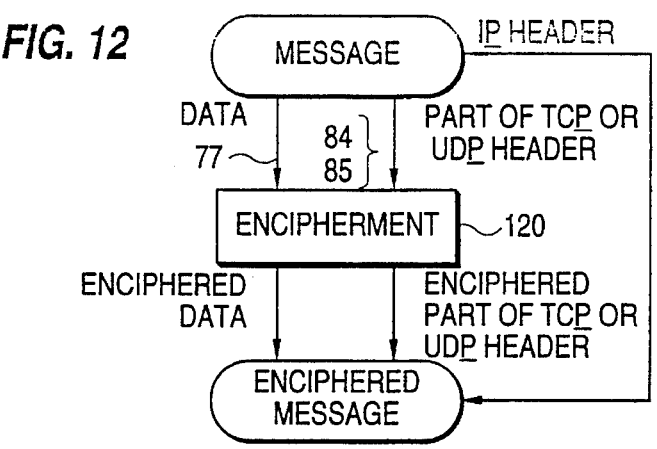
FIG. 12 illustrates the general principle of the method of the present invention.

FIG. 7 is the prior art Ethernet header 73 proper and FIG. 8 shows the ISO 8802.2 header 74. The prior art IP header 75 is represented in FIG. 9. The prior art headers of FIGS. 7, 8 and 9 are transmitted without encryption in the method according to the invention. FIGS. 10 and 11 show prior art the TCP 80 and UDP 81 headers respectively.

Only the lower parts 82 and 83 respectively of these headers are enciphered and advantageously the so-called "checksum" parts 84 and 85 of these latter.

As is immediately apparent and as follows from the foregoing, the invention also relates to all the variants of the methods and devices described.

In particular, the basic method of the invention comprising enciphering the "data" part of a message while leaving without encryption the "header" part of the message allowing its routing, can be used with other protocols, and in particular with the network protocol specified by the "Connectionless Network Protocol" international standard ISO8473. To do this the length of the IEEE8802.2 and CLNS ISO8473 header fields are taken into account so as to determine the start of the encipherment/decipherment zone in each message using the ISO8473 protocol.

We claim:

1. A method for enciphering messages transmitted via at least one highway interconnecting at least two networks using an Internet protocol as a network layer protocol and one of a TCP or UDP protocol as a transport layer protocol and the highway using the Internet protocol as a network layer protocol to transmit the messages having a plurality of headers including an Internet header and one of a TCP or a UDP header and data comprising:

transmitting the messages via the highway with at least a part of one of the TCP or UDP header and the data being enciphered at the same time; and transmitting the Internet header with the messages without enciphering on the highway.

2. A method according to claim 1 wherein:

enciphering the part of one of the TCP or UDP header and the data with a Data Encryption Standard with the part of one of the TCP or UDP header and the data comprising a string of bits having a length divisible by 64.

3. A method according to claim 2 wherein:

the Data Encryption Standard is used in a CBC mode with an initial vector required by the CBC mode modified as a function of time in order to avoid unauthorized replay.

4. A method according to claim 1 wherein:

the part of one of the TCP or UDP header comprises a checksum field of the TCP or UDP header.

5. A method of processing messages transmitted between first and second items of equipment contained respectively in interconnected first and second networks, each of the first and second networks including at least one sending equipment and one receiving equipment authorized to send and receive respectively messages enciphered by the method for enciphering according to claim 1 wherein each message is processed with the following steps:

verifying a presence of a first memory card to authenticate a first operator of the first item of equipment;

determining what protocol is being used between the first and second items of equipment, and if the protocol used is Internet network layer protocol searching for a first key associated with the sending equipment of the first item of equipment and for a second key associated with the receiving equipment of the second item equipment;

if the first and second keys exist, enciphering a message to be sent with the first key to obtain an enciphered message, and transmitting the enciphered message by the sending equipment of the first item of equipment and otherwise rejecting the message to be sent;

verifying a presence of a second memory card to authenticate a second operator of the second item of equipment; and if the first and second keys exist, deciphering a received message with the second key and otherwise rejecting a received message.

6. An application of the method according to claim 1 further comprising:

protecting access to servers of computer network with the method for enciphering messages.

7. An interface apparatus connected between a highway and one of a network or an item of equipment, the highway using a specified network layer protocol, and permitting a transmission of messages via the highway between one of the network or the item of equipment to which the interface apparatus is connected and another one of the network or the item of equipment to which another interface apparatus is connected, each of the messages containing a plurality of headers including an Internet header and one of a TCP or UDP header and data comprising:

means for reading a memory card;

means for enciphering, for each of the messages, the data and at least a part of one of the TCP or UDP header to obtain enciphered data and an enciphered part of one of the TCP or UDP header and with the Internet header not being enciphered;

means for transferring an enciphered message comprising the Internet header, the enciphered data and the enciphered part of one of the TCP or UDP header, for routing of the enciphered message via the highway; and means for identifying one of the networks or items of equipment associated with the interface apparatus.

8. An interface apparatus according to claim 7 further comprising:

means for deciphering received enciphered messages.

9. An interface apparatus according to claim 7 further comprising:

an item of equipment of a station or a server type associated with the interface apparatus via one of direct connection or a protected network.

10. An interface apparatus according to claim 7 further comprising:

means for authorizing or prohibiting an association between the interface apparatus and one of the network or item of equipment.

11. An interface apparatus according to claim 7 further comprising:

an item of equipment of the server type associated with the interface apparatus.

12. An application of the interface apparatus according to claim 7 further comprising:

a communication network coupled to the interface apparatus using a protocol of the Internet.

* * * * *